3,100,376
METHOD OF CLEANING ENGINE EXHAUST
GASES
Barrie V. Potter, Westfield, N.J., assignor to Esso Research and Engineering Company, a corporation of Delaware
Filed Oct. 10, 1960, Ser. No. 61,591
5 Claims. (Cl. 60—30)

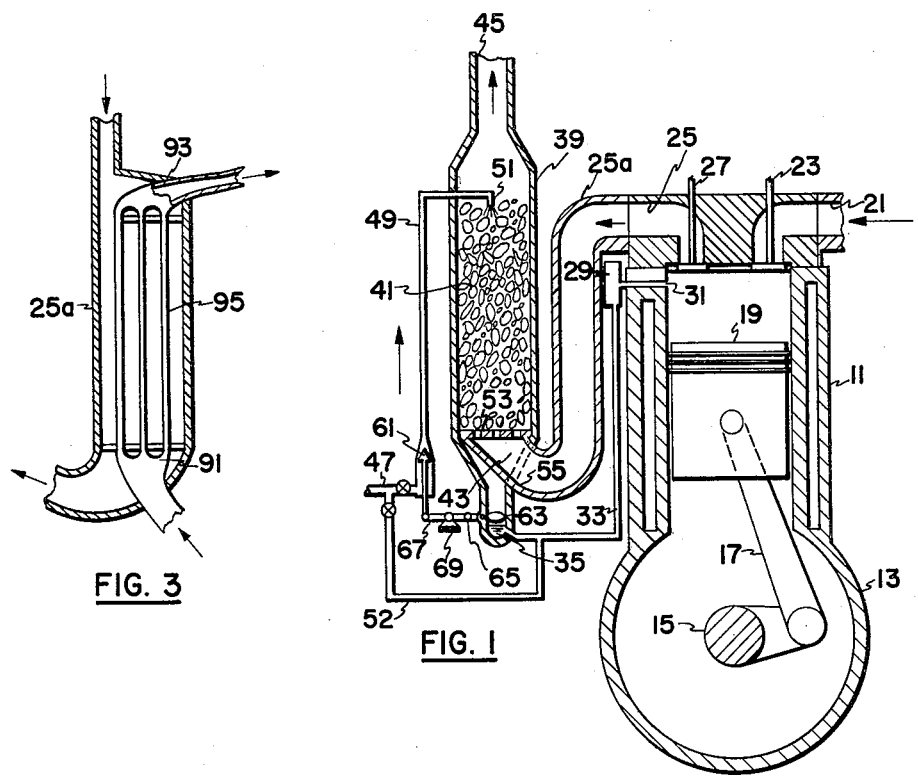
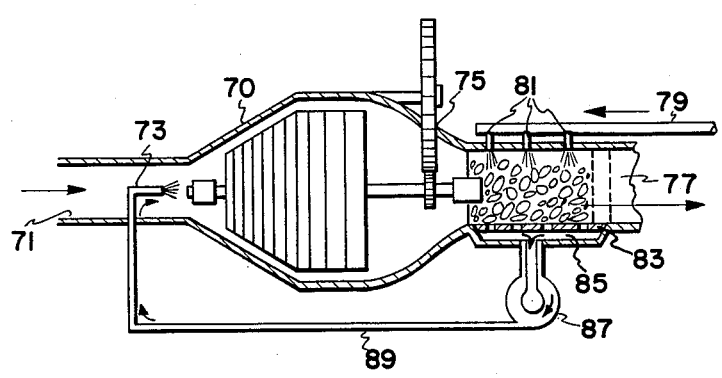

The present invention relates to a method of cleaning engine exhaust gases. It relates more particularly to a method of removing unburned or incompletely burned elements from the exhaust gases of internal combustion engines, and it has special application to engines which utilize liquid fuel as an energy source.

In the prior are numerous attempts have been made to prevent the exhaust gases from internal combustion engines from polluting the atmosphere, contaminating it into smog and other unhealthful or unpleasant atmospheric conditions. Attempts have been made to filter out from the exhaust the undesirable olefins, soot particles, partially burned oil droplets and the like. Attempts have also been made to supplement combustion by supplying additional air into catalytically active zones through which exhaust gases are passed. These attempts have not been altogether successful and, moreover, they make no use of the residual energy in the unburned or partly burned particles and elements in the exhaust.

It is an object of the present invention not only to remove the undesired particles from the exhaust gases, but to use them as fuel components in the engine and thereby obtain higher operating efficiency on the basis of fuel consumed.

The invention is applicable not only to piston type engines, but also to turbine engines and in fact to any type of engine using liquid fuel as its primary source of energy. It has particular application to diesel engines and oil-fired turbines, but is suitable to be applied to spark-ignited engines and other types of prime movers.

The invention will be more clearly understood by reference to the attached drawing wherein:

FIG. 1 is a vertical elevational view, partly in section, of the invention as applied to an upright internal combustion engine;

FIG. 2 is a modification applied to a turbine; and

FIG. 3 is a fragmentary view showing a modification designed to recover combustible components from exhaust gases containing large quantities of heat.

Referring first to FIG. 1, there is shown a conventional engine of the diesel type having a jacketed cylinder wall 11, a crankcase 13, a main crankshaft 15, connecting rod 17, and piston 19. An intake opening 21 is shown fragmentarily, controlled by valve 23 operated by a suitable valve actuating mechanism of conventional type which is not shown in the drawing. Likewise, an exhaust opening 25 is controlled by exhaust valve 27 similarly operated by conventional means. A fuel injector unit 29 of conventional type is provided to inject the oil through the opening 31 at the appropriate time. The operating mechanism for the injector also is conventional. Fuel is supplied to the injector through a line 33 connected to a sump 35 in the bottom portion of a scrubber unit next to be described.

The scrubber unit indicated at 39 is packed with a suitable packing which may be of the fibrous filter type, or may be of inert spherical bodies such as marbles or pellets of various type as indicated at 41. The arrangement is such that exhaust gases from exhaust outlet 25 are introduced at the bottom of the scrubber unit through inlet 43, and passed upwardly through the packing to discharge to the atmosphere through the outlet 45.

A stream of fresh liquid fuel, for example diesel fuel of conventional type, is introduced from a supply 47 through a line 49 to a nozzle 51 where the liquid fuel is finely subdivided into spray which contacts the packing 41 and trickles downwardly through it under the force of gravity. It is not necessary to use all the engine fuel for this purpose. Part of it may be passed directly to the engine through a bypass line 52. The finely divided liquid fuel from nozzle 51 contacts the packing and the ascending exhaust gases simultaneously. The liquid fuel picks up from the exhaust gases unburned or partly burned elements such as oil droplets, soot particles, olefin vapors which condense in the cooler liquid, and all of these materials are entrained and passed through foraminated members 53 and 55 into a collecting sump 35.

As noted above, the fuel with its entrained particles scrubbed from the exhaust gases, is supplied through line 33 to the injector 29 which feeds this material into the engine.

In order to keep the fuel spray supply and engine requirements in balance, a suitable throttle valve 61 is provided in the line 49. This is controlled by a float member 63 inside sump 35 at the bottom of packed column 39. If the liquid should rise in sump 35, the float also rises, rotating its arm 65 counter-clockwise. This arm is connected to another arm 67 pivoted at 69 which is rotated clockwise as the float rises. When this occurs, the needle valve 61 tends to restrict the flow of fuel in line 49. Additional controls may be placed in line 52 if desired.

Conversely, if the engine requires more fuel, the float 63 is lowered, opening the control valve 61 to permit a larger flow of fuel.

In FIG. 2, a conventional gas turbine is shown at 70 with an air inlet 71, fuel supply nozzle 73, power takeoff 75 and exhaust outlet 77. Exhaust gases are passed through contacting material, either fibrous or granular, and the packing material is sprayed with fresh liquid fuel so as to scrub the unburned or partly burned particles out of the exhaust gases. The fuel supply line is shown at 79 and spray nozzles at 81. The finely divided fuel passes downwardly through the packing and through a foraminous support such as a screen 83. Below this screen the fuel accumulates in sump 85 from which it is withdrawn by a pump 87 and it is then forwarded through line 89 to the feed inlet 73. The same type of control as indicated at 63, 65, 61, FIG. 1, may be employed in FIG. 2 if desired. Hence it is not shown in detail.

In some cases the exhaust gases may contain so much heat that they will vaporize the fuel, or at least will not permit the fuel to condense all of the elements in the exhaust gases which should be removed. In this case it may be desired to increase the cooling effect of the fuel. For this purpose, the exhaust line 25 or that portion of it, 25a, which carries the exhaust gases to the bottom of packed column 39, may be cooled by passing the exhaust gases in heat exchange relationship with incoming air for the intake. For this purpose, the arrangement in FIG. 3 is suitable. Here the tube 25a is enlarged and contains headers 91, 93 connected by heat exchange tubes 95, the arrangement being such that the intake air passes through the tubes 95 and into the intake of the engine. The exhaust gases are cooled as they pass downwardly around the tubes and from the bottom of the heat exchanger they are taken into the scrubber or contacting column such as 39, FIG. 1, where the unburned particles are removed therefrom.

Alternatively, if desired, the exhaust gases may be cooled in other ways or the liquid fuel which is used to scrub the unburned particles from the exhaust gases may be refrigerated or cooled in any desired manner. For example, the liquid fuel sprayed into the tower at 51 or at 81 in FIG. 2, may be recycled or part of it may be recycled, through suitable cooling means so that it may more effectively remove unburned or partly burned exhaust gas elements.

Other modifications will suggest themselves to those skilled in the art, and it is intended to cover such modifications by the following claims so far as their proper interpretation and the state of the prior art may permit.

What is claimed is:

1. The method of removing incompletely burned elements from exhaust gases of an internal combustion engine which comprises subdividing a liquid hydrocarbon fuel of diesel type into small particles to increase its surface area, sweeping said exhaust gases with said subdivided fuel to pick up said elements, collecting said subdivided fuel and said elements, and feeding said fuel and elements to said engine whereby the energy values in said fuel are more fully utilized.

2. Apparatus for cleaning undesirable elements out of the exhaust gases of an engine which intakes liquid fuel not evaporable in said gases, comprising means for feeding said fuel in finely divided form into the path of said gases, means for collecting said finely divided fuel plus the elements gathered from said gases, and means for forcing said fuel and elements into the intake of said engine.

3. Apparatus for cleaning the exhaust gases of an internal combustion engine which has an intake for liquid diesel fuel, which comprises a packed zone, means for directing said gases through a part of said zone, means for supplying liquid fuel to said zone, means for finely dividing said fuel and placing it in contact with the packing in said zone, means for collecting said finely divided fuel, and means for supplying said collected fuel to said intake.

4. Apparatus according to claim 3 which includes means controllable by the collected fuel for controlling said liquid supply means.

5. The method of removing unburned or partly burned elements such as olefins, soot particles and the like from engine exhaust gases, which comprises scrubbing said gases with a liquid fuel of diesel grade, collecting a reservoir of the fuel after scrubbing, using said fuel to operate said engine, and using the reservoir to control the supply of fuel for scrubbing.

References Cited in the file of this patent

UNITED STATES PATENTS

| | | |
|---|---|---|
| 1,296,115 | Pfeifer | Mar. 4, 1919 |
| 1,762,229 | Isom | June 10, 1930 |
| 1,961,444 | Lewis | June 5, 1934 |
| 2,142,545 | Willenborg | Jan. 3, 1939 |
| 2,443,841 | Sweeney et al. | June 22, 1948 |
| 2,677,237 | Voysey | May 4, 1954 |
| 2,956,559 | Johnson | Oct. 18, 1960 |